United States Patent [19]
Kishi

[11] Patent Number: 4,541,398
[45] Date of Patent: Sep. 17, 1985

[54] METHOD OF CONTROLLING AN EXHAUST GAS RECIRCULATING VALVE IN AN INTERNAL COMBUSTION ENGINE

[75] Inventor: Noriyuki Kishi, Tokyo, Japan

[73] Assignee: Honda Giken Kogyo Kabushiki Kaisha, Tokyo, Japan

[21] Appl. No.: 624,614

[22] Filed: Jun. 26, 1984

[30] Foreign Application Priority Data

Jun. 30, 1983 [JP] Japan ................. 58-118720

[51] Int. Cl.$^4$ ............................ F02M 25/06
[52] U.S. Cl. ................................. 123/571
[58] Field of Search ................ 123/568, 569, 571

[56] References Cited

U.S. PATENT DOCUMENTS

| | | | |
|---|---|---|---|
| 4,378,776 | 4/1983 | Nishimori | 123/571 |
| 4,378,777 | 4/1983 | Iida et al. | 123/571 |
| 4,409,948 | 10/1983 | Hasegawa et al. | 123/571 |
| 4,428,355 | 1/1984 | Yokooku | 123/571 |
| 4,442,820 | 4/1984 | Ina et al. | 123/571 |
| 4,448,178 | 5/1984 | Yamato et al. | 123/571 |

*Primary Examiner*—Parshotam S. Lall
*Assistant Examiner*—W. R. Wolfe

*Attorney, Agent, or Firm*—Lyon & Lyon

[57] ABSTRACT

A method of controlling an exhaust gas recirculation quantity in an internal combustion engine. The method is adapted to detect, by means of valve opening detecting means, the actual valve opening of an exhaust gas recirculating valve arranged across an exhaust gas recirculating passageway communicating the exhaust passage of the engine with the intake passage thereof, determine the difference between the detected actual valve opening value and a desired valve opening value calculated in response to operating conditions of the engine, and operate a valve actuator means to close or open the exhaust gas recirculating valve so as to minimize the above difference. When the calculated desired valve opening value exceeds a maximum possible valve opening value, the desired valve opening value is set to the maximum possible valve opening value. Preferably, an absolute value of the above difference is compared with a predetermined value, and when the absolute value has continued to exceed the predetermined value over a predetermined period of time, it is determined that an abnormality has occurred in the valve opening detecting means. Preferably, the above valve actuator means is a pressure responsive type.

3 Claims, 5 Drawing Figures

| Ne \ PBA | PB6 | PB7 | ---- | PBj | ---- | PB15 |
|---|---|---|---|---|---|---|
| N1 | L1.6 | L1.7 | | | | |
| N2 | L2.6 | L2.7 | | | | |
| ⋮ | | | | | | |
| Ni | | | | Lij | | |
| ⋮ | | | | | | |
| N10 | | | | | | L10,15 |

METHOD OF CONTROLLING AN EXHAUST GAS RECIRCULATING VALVE IN AN INTERNAL COMBUSTION ENGINE

BACKGROUND OF THE INVENTION

This invention relates to an exhaust gas recirculating valve control method for internal combustion engines, and more particularly to a method of this kind, which is adapted to prevent making a wrong diagnosis upon detecting abnormality in an exhaust gas recirculating valve control system as well as to ensure required durability of the exhaust gas recirculating valve control system.

A method is generally known, which is adapted to recirculate part of exhaust gases from the exhaust passage of an internal combustion engine to the intake air passage of the engine to thereby reduce nitrogen oxide which is one of the detrimental gases generated from the engine. Also, in order to determine an appropriate exhaust gas recirculating quantity in response to operating conditions of the engine, an exhaust gas recirculating valve control method has been used, which is adapted to detect actual valve opening of an exhaust gas recirculating valve arranged across an exhaust gas recirculating passageway, and control the actual valve opening value so that it approaches a desired valve opening value calculated in response to the operating conditions of the engine.

In such an exhaust gas recirculating quantity control method as stated above, when abnormality occurs in valve opening detecting means including a valve opening detecting sensor for detecting the valve opening of the exhaust gas recirculating valve due to disconnection in the wiring, etc., it is impossible to accurately control the exhaust gas recirculating quantity, which can even cause the phenomenon that exhaust gas recirculation is effected when it is unnecessary, depending upon operating conditions of the engine, resulting in heavy deterioration of the engine. Therefore, it has been proposed by Japanese Provisional Patent Publication (Kokai) No. 55-123345, to give an alarm when it is detected that the ratio or the difference between the actual valve opening value detected by the valve opening detecting sensor and the desired valve opening value falls outside an allowable range.

However, if the desired valve opening value calculated in response to operating conditions of the engine exceeds of a maximum possible valve opening of the exhaust gas recirculating valve, i.e., a valve opening beyond which the exhaust gas recirculating valve cannot be operated, the difference between the actual valve opening value and the desired valve opening value will not be reduced even if a control signal is issued for operating the exhaust gas recirculating valve to the desired valve opening value. As a consequence, it can be wrongly judged that the exhaust gas recirculating valve has developed an abnormality.

Further, in an exhaust gas recirculating valve control system in which the exhaust gas recirculating valve is driven by pressure respsonsive type valve actuator means which is responsive to hydraulic pressure for instance, if the desired valve opening value is set to a value beyond the maximum possible valve opening of the exhaust gas recirculating valve, the hydraulic pressure is set to such a value as to cause a larger differential pressure to act upon the valve actuator means so as to open the exhaust gas recirculating valve to an opening degree closer to the set desired valve opening value. However, the larger the differential pressure acting upon the valve actuator means, the more easily the hydraulic pressure can leak from the valve actuator means. Also, the valve actuator means thus acted upon by the large differential pressure can deteriorate in durability such as the effective life. On the contrary, if the valve actuator means, etc. are designed so as to be free from such leakage of the hydraulic pressure as well as to ensure required durability of the valve actuator means, etc. it will necessarily result in increased sizes and weights of the valve actuator means, etc. as well as increased manufacturing costs thereof.

SUMMARY OF THE INVENTION

It is an object of the invention to provide an exhaust gas recirculating valve control method for an internal combustion engine, which is capable of accurately detecting abnormality in the exhaust gas recirculation control system of the engine without making a wrong diagnosis.

It is another object of the invention to provide an exhaust gas recirculating valve control method for an internal combustion engine, which is capable of ensuring equired durability of the exhaust gas recirculation control system, without unnecessary increases in the size, weight and manufacturing cost of the system.

According to the present invention, there is provided a method of controlling an exhaust gas recirculating quantity in an internal combustion engine having an exhaust gas passage, an intake air passage, an exhaust gas recirculating passageway communicating the exhaust gas passage with the intake air passage, an exhaust gas recirculating valve arranged across the exhaust gas recirculating passageway for regulating the quantity of exhaust gases recirculating from the exhaust gas passage to the intake air passage, a valve actuator means for actuating the exhaust gas recirculating valve to open or close, and detecting means for detecting actual valve opening of the exhaust gas recirculating valve. The method is adapted to calculate a desired valve opening value of the exhaust gas recirculating valve in response to operating conditions of the engine, calculate the difference between the actual valve opening value detected by the valve opening detecting means and the calculated desired valve opening value, and operate the valve actuator means so as to minimize the difference.

The method is characterized by comprising the following steps: (1) comparing the calculated desired valve opening value with a maximum possible valve opening value of the exhaust gas recirculating valve; and (2) setting the desired valve opening value to the maximum possible valve opening value when the calculated desired valve opening value exceeds the maximum possible valve opening value.

Preferably, the method according to the invention further includes the steps of comparing an absolute value of the above difference with a predetermined value, and determining that an abnormality has occurred in the valve opening detecting means when the absolute value of the difference has continued to exceed the predetermined value over a predetermined period of time.

Further, preferably, the valve actuator means is a pressure responsive type which has a diaphragm operatively connected to the exhaust gas recirculating valve, and operable in response to the magnitude of operating pressure acting upon the diaphragm.

The above and other objects, features and advantages of the invention will be more apparent from the ensuing detailed description taken in conjunction with the accompanying drawings.

DETAILED DESCRIPTION

The method of the invention will now be described in detail with reference to the drawings.

Figure 1:
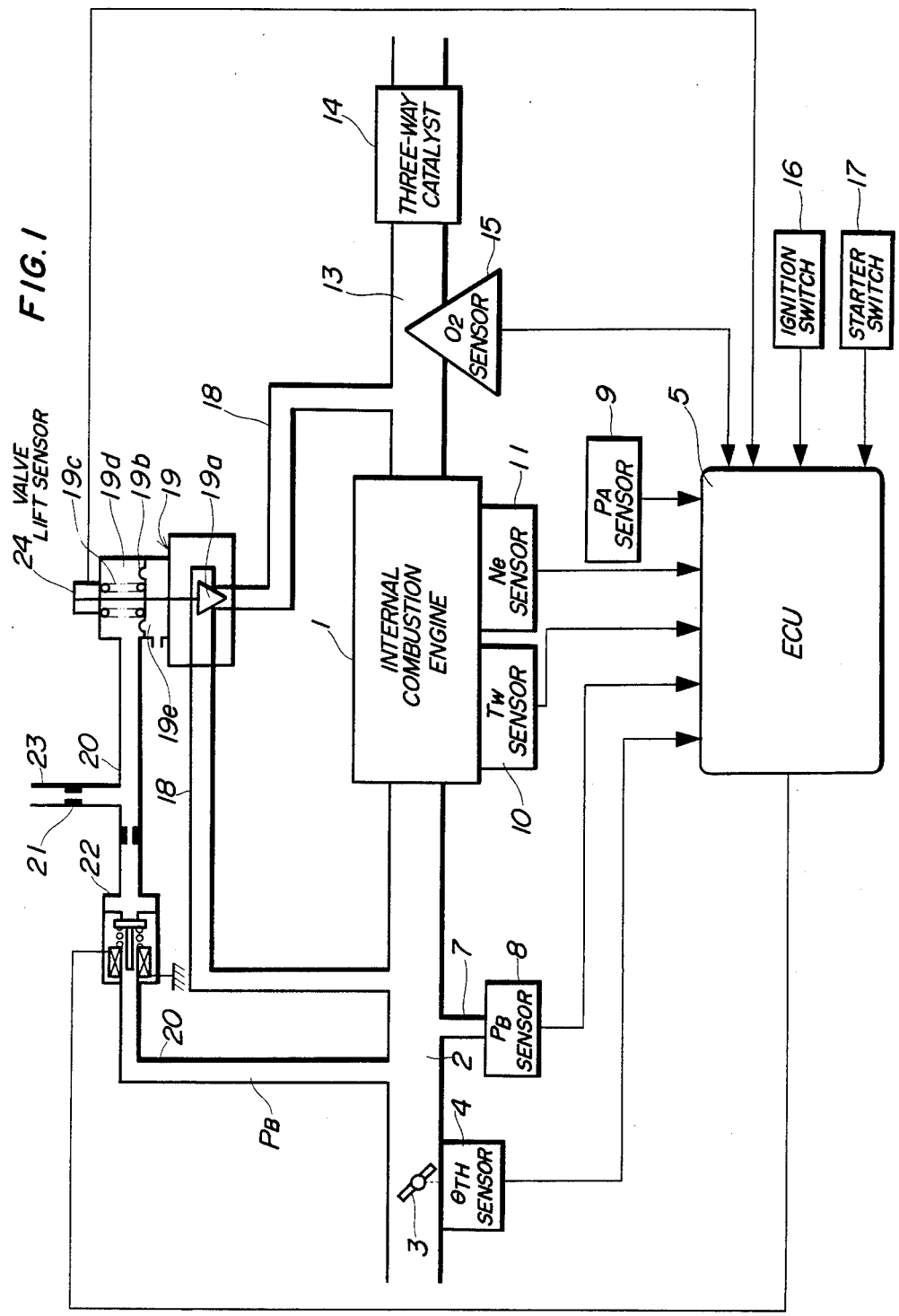
FIG. 1 is a block diagram illustrating the whole arrangement of an exhaust gas recirculating valve control system to which is applied the method according to the invention.

Referring first to FIG. 1, there is illustrated the whole arrangement of an exhaust gas recirculation control system in an internal combustion engine, to which the method according to the invention is applied. Reference numeral 1 designates an internal combustion engine which may be a four-cylinder type, for instance. An intake pipe 2 is connected to the engine 1, in which is arranged a throttle valve 3, which in turn is coupled to a throttle valve opening ($\theta$th) sensor 4 for detecting its valve opening and converting same into an electrical signal which is supplied to an electronic control unit 40 (hereinafter called "the ECU") 5.

On the other hand, a negative pressure (PB) sensor 8 communicates through a conduit 7 with the interior of the intake pipe 2 at a location downstream of the throttle valve 3. The negative pressure (PB) sensor 8 is adapted to detect negative pressure in the intake pipe 2 and applies an electrical signal PB indicative of detected intake pipe pressure to the ECU 5.

An engine cooling water temperature (TW) sensor 10, which may be formed of a thermistor or the like, is mounted on the cylinder block of the engine 1 in a manner embedded in the peripheral wall of an engine cylinder having its interior filled with cooling water, an electrical output signal of which is supplied to the ECU 5.

An engine rotational speed (Ne) sensor (hereinafter called "the Ne sensor") 11 is arranged in facing relation to a camshaft, not shown, of the engine 1 or a crankshaft of same, not shown. The NE sensor 11 is adapted to generate one pulse at one of particular crank angles of the engine each time the engine crankshaft rotates through 180 degrees, i.e., a pulse of a top-dead-center position (TDC) signal. The above pulses generated by the Ne sensor 11 are supplied to the ECU 5.

A three-way catalyst 14 is arranged in an exhaust pipe 13 extending from the cylinder block of the engine 1 for purifying ingredients HC, CO and NOx contained in the exhaust gases. An O$_2$ sensor 15 is inserted in the exhaust pipe 13 at a location upstream of the three-way catalyst 14 for detecting the concentration of oxygen in the exhaust gases and supplying an electrical signal indicative of a detected concentration value to the ECU 5.

Further connected to the ECU 5 are an atmospheric pressure (PA) sensor 9 for detecting atmospheric pressure, an ignition switch 16 for turning on and off the ignition device, not shown, of the engine 1 and a starter switch 17 for actuating the engine starter, not shown, of the engine 1, respectivly, for supplying the ECU 5 with an electrical signal indicative of detected atmospheric pressure, an electrical signal indicative of on and off positions of the ignition device, and an electrical signal indicative of on and off positions of the starter.

An exhaust gas recirculating passageway 18 connects the exhaust pipe 13 to the intake pipe 2, and across which is disposed an exhaust gas recirculating valve 19. This valve 19 is a negative pressure-actuated type and comprises a valve body 19a arranged for opening and closing the passageway 18, a diaphragm 19b coupled to the valve body 19a and actuatable by negative pressure which is applied thereto by means of an EGR control valve 22 which is formed by a solenoid-controlled valve, hereinafter described, and a spring 19c urging the diaphragm 19b in the valve closing direction. A negative pressure chamber 19d is defined by the diaphragm 19b, which communicates with a communication passageway 20 to be supplied with negative pressure from the intake pipe 2 by way of the EGR control valve 22 which is a normally closed type and arranged across the communication passageway 20. An atmospheric pressure chamber 19e is defined by the diaphragm 19b, which communicates directly with the atmosphere. An atmospheric pressure-intake passageway 23 is joined to the communication passageway 20 at a location intermediate between the EGR control valve 22 and the negative pressure chamber 19d of the valve 19 so that atmospheric pressure can be introduced into the communication passageway 20 by way of an orifice 21 formed therein, and then guided into the negative pressure chamber 19d. The EGR control valve 22 is electrically connected to the ECU 5 for operation in response to driving signals therefrom to control the lifting amount of the valve body 19a of the exhaust gas recirculating valve 19 and the moving speed thereof.

A valve lift sensor 24, which may be formed of a potentiometer, is mounted on the exhaust gas recirculating valve 19 for detecting the operating position of the valve body 19a of the valve 19 and supplying an electrical signal indicative of a detected operating position of the valve body to the ECU 5.

The ECU 5 determines, in a manner hereinafter described, whether there is abnormality in the output signal value from the valve lift sensor 24, and also determined operating conditions of the engine on the basis of various operating parameter signals from the aforementined various sensors, i.e. the throttle valve opening sensor 4, the negative pressure sensor 8, the atmospheric pressure sensor 9, the engine cooling water temperature sensor 10, the Ne sensor 11, the O$_2$ sensor 15, the ignition switch 16, and the starting switch 17, and calculate desired valve opening command values LCMD for the exhaust gas recirculating valve 19, which are appropriate to the determined operating conditions of the engine, in a manner hereinafter described in detail.

The ECU 5 compares the calculated desired valve opening command value LCMD with an actual valve opening value LACT detected by the valve lift sensor 24, and supplies driving signals to the EGR control valve 22 to actuate same so as to minimize the difference between the two values.

When the EGR control valve 22 is energized to open the communication passageway 20, the negative pressure PB in the intake pipe 2 at a zone downstream of the throttle valve 3 is introduced into the negative pressure chamber 19d of the exhaust gas recirculating valve 19. Thus, the difference between the pressures acting upon the opposite side surfaces of the diaphragm 19b increases to cause upward displacement of the diaphragm 19b as viewed in FIG. 1, against the force of the spring 19c, resulting in an increase in the valve opening of the valve 19. On the contrary, when the EGR control valve 22 is deenergized, the negative pressure chamber 19d is supplied with atmospheric air along through the atmospheric pressure-intake passageway 23 to cause displacement of the valve body 19a downward or in the valve closing direction. In this way, the valve lifting amount of the exhaust gas recirculating valve 19 is controlled to obtain a required recirculating amount of exhaust gases to the intake pipe 2.

Figure 2:
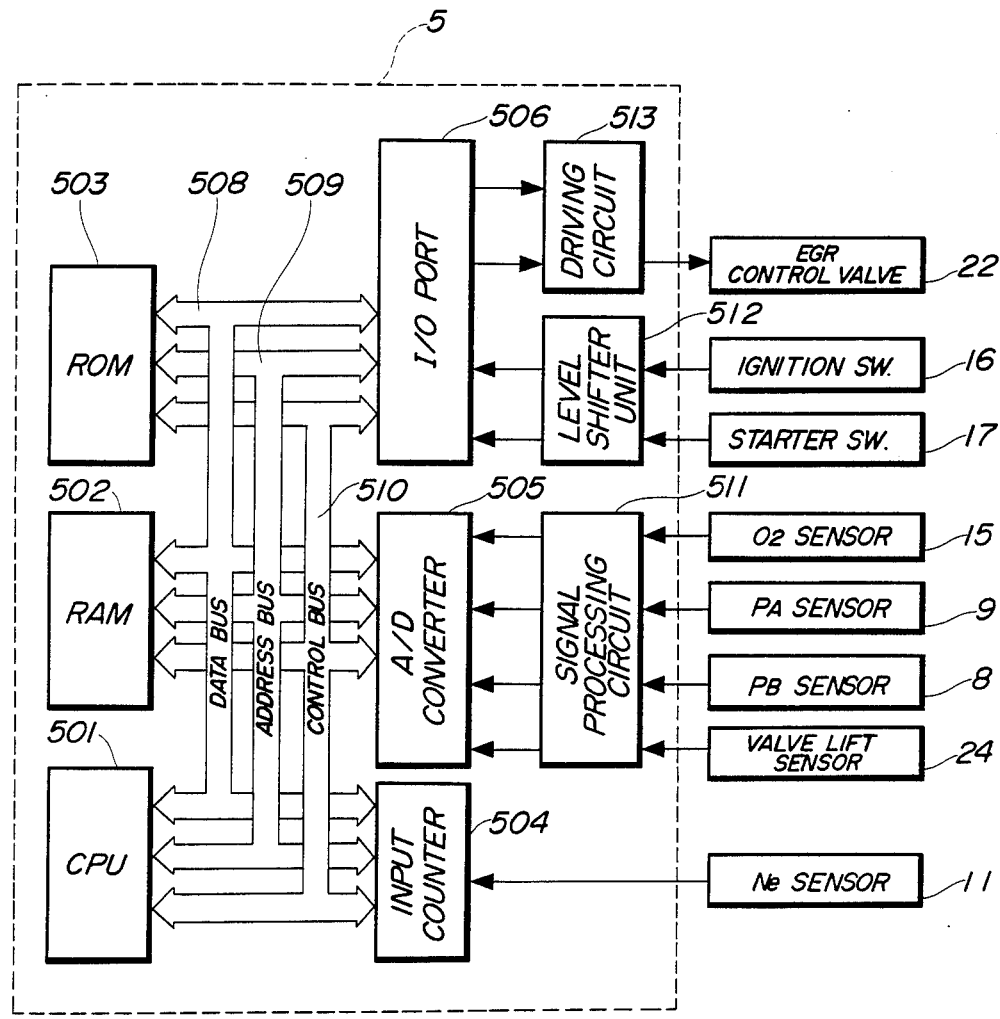
FIG. 2 is a circuit diagram showing the interior of the electronic control unit (ECU) in FIG. 1.

FIG. 2 shows in the form of a block diagram the interior construction of the ECU 5 in FIG. 1. A central processing unit (hereinafter called "the CPU") 501 is connected, by way of a data bus 508, an address bus 509 and a control bus 510, to a random access memory (hereinafter called "the RAM") 502 for temporarily storing results of calculations within the CPU 501, etc., a read-only memory (hereinafter called "the ROM") 503 for storing a control program to be executed within the CPU 501, a map of basic valve lift values LMAP, hereinafter referred to, for the exhaust gas recirculating valve 19, etc., an input counter 504, an A/D converter 505, and an I/O port 506, for giving and receiving of input data and output data between the CPU 501 and the RAM 502, etc. through the above buses.

The TDC signal from the Ne sensor 11 in FIG. 1 is supplied to the above input counter 504, which is actuated by each pulse of the TDC signal to generate a single pulse and apply same to the CPU 501 through the data bus 508 is a TDC-synchronizing signal, and at the same time the input counter 504 counts the time interval Me between adjacent pulses of the TDC signal. The counted value Me, which is proportional to the reciprocal of the engine rpm Ne, is supplied to the CPU 501 through the data bus 508.

Parameter signals from the various sensors such as the intake pipe negative pressure (PB) sensor 8, the atmospheric pressure (PA) sensor 9, the $O_2$ sensor 15, the valve lift sensor 24, etc. as appearing in FIG. 1, are shifted into a predetermined voltage level by means of a signal processing circuit 511, and then successively applied to the A/D converter 505 to be converted into respective corresponding digital signals. These digital signals are successively supplied to the CPU 501.

On-off position signals from the ignition switch 16 and the starter switch 17 are successively shifted into a predetermined voltage level by means of a level shifter 512, and then are successivly supplied to the CPU 501 through the I/O port 506.

The CPU 501 calculates the desired valve opening command value LCMD for the exhaust gas recirculating valve 19, compare the difference between the calculated desired valve opening value LCMD and the actual valve opening LACT, and supply an on-off position control signal to a driving circuit 513 through the I/O port 506, so as to minimize the difference between the desired valve opening value LCMD and the actual valve opening LACT. The driving circuit 513 is responsive to each pulse of the control signal to supply a driving pulse to the EGR control valve 22 to energize same for a period of time corresponding to the pulse duration of the same control signal.

Figures 3, 4:
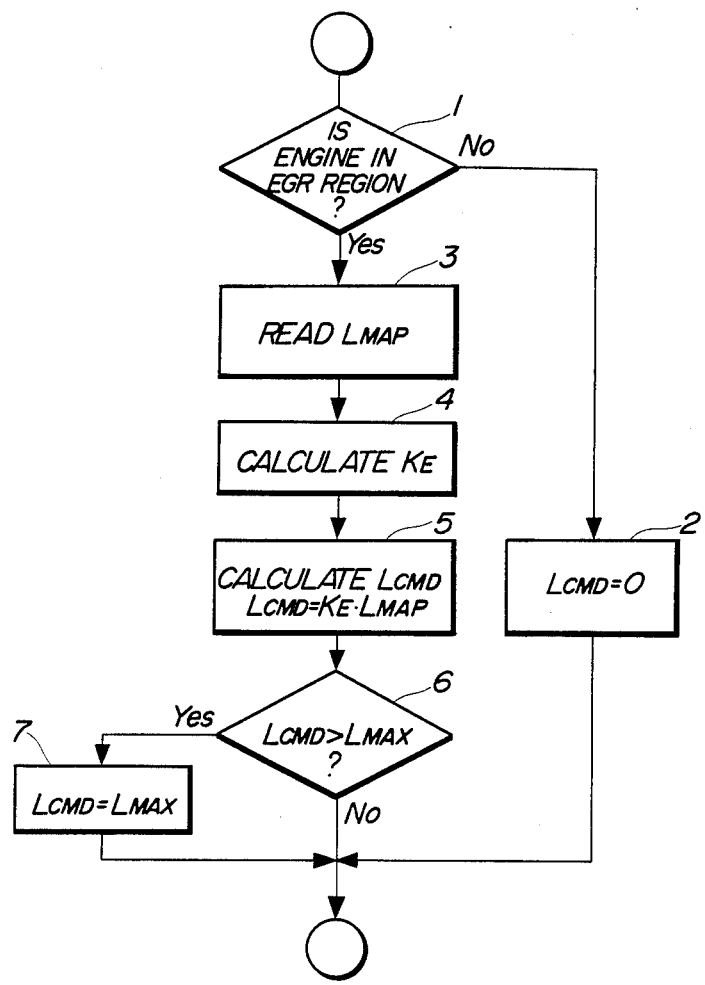
FIG. 3 is a flow chart showing a manner of setting a desired valve opening value for an exhaust gas recirculating valve, which is executed within the ECU in FIG. 1.
FIG. 4 is a view showing a map of engine rotational speed Ne and intake pipe absolute pressure PB for use in calculating a basic valve lift value LMAP for the exhaust gas recirculating valve.

FIG. 3 is a flow chart showing an example of the manner of calculating the desired valve opening command value LCMD, which is executed within the CPU 501 in FIG. 2.

At the step 1, it is determined whether or not the engine is operating in an exhaust gas recirculation effecting region. More specifically, precluded from the exhaust gas recirculation effecting region are regions where the exhaust gas recirculation can spoil the startability and driveability of the engine, e.g. a region where the engine temperature is low at the start of the engine, a region where the throttle valve is fully open requiring high engine output, and a region where the engine is in a fuel out condition at deceleration. If the engine is operating in one of such regions precluded from the exhaust gas recirculation effecting region, that is, if the answer to the question of the step 1 is negative, the desired valve opening command value LCMD for the exhaust gas recirculating valve 19 is set to zero, at the step 2.

If the answer to the question of the step 1 is affirmative, a basic valve lift value LMAP of the desired valve opening command value LCMD is selectively read from the map of basic valve lift values LAMP stored in the ROM 503 in FIG. 2, at the step 3. Each of the basic valve lift values LMAP is determined as a function of the intake pipe negative pressure PB and the engine rotational speed Ne, for example. FIG. 4 shows an example of the map of basic valve lift values LMAP. There are given ten predetermined values PB6 to PB15 falling within a range from 560 to 0 mmHg, for instance, as the intake pipe negative pressure PB. Also, there are given ten predetermined values N1 to N10 falling within a range from 0 to 4000 rpm, for instance, as the engine rotational speed Ne. If an actual value of either intake pipe negative pressure PB or engine rotational speed Ne falls between adjacent predetermined values in the map, a corresponding basic valve lift value LMAP is determined by means of an interpolation method.

Then, the program proceeds to the step 4 to calculate a correction coefficient KE for correcting the basic valve lift value LMAP. This correction coefficient KE has its value set in dependence on atmospheric pressure PA, degree of leaning an air/fuel mixture supplied to the engine in a mixture leaning region, etc. Taking for instance the manner of determining the correction coefficient KE as a function of atmospheric pressure PA, the exhaust gas recirculating valve 19 is operated in its valve opening direction as the atmospheric pressure PA decreases so as to maintain the exhaust gas recirculation rate (the ratio of the exhaust gas recirculating quantity to the total intake air quantity) at a constant value. That is, the value of the correction coefficient KE is set to greater values than a value KEO of the same coefficient corresponding to standard atmospheric pressure, as the atmospheric pressure PA decreases. Thus, the value of coefficient KE is increased as the atmospheric pressure PA decreases so as to maintain the exhaust gas recirculation rate constant. This is based on the following ground: In a fuel supply control system adapted for use with an internal combustion engine, particularly a gasoline engine, which is adapted to determine the valve opening period of a fuel injection device for control of the fuel injection quantity, i.e. the air/fuel ratio of an air/fuel mixture being supplied to the engine, by first determining a basic value of the above valve opening period as a function of engine rpm and intake pipe absolute pressure, and then adding to and/or multiplying same by constants and/or coefficients being functions of engine rotational speed, intake pipe negative pressure, engine cooling water temperature, throttle valve opening, and exhaust gas ingredient concentration (oxygen concentration), etc., by electronic computing means, it is not possible to obtain an optimum air/fuel ratio if there occurs a change in the atmospheric pressure during operation of the engine at high altitude, etc. When such is the case, in order to obtain an optimum air/fuel ratio, it is necessary to correct the fuel supply quantity for the engine in response to a change in the atmospheric pressure so as to maintain the air/fuel ratio set under the standard atmospheric pressure. Therefore, the above determined basic value of the valve opening period is further multiplied by an atmospheric pressure-dependent correction coefficient KPA.

However, in an engine provided with an exhaust gas recirculating system, absolute pressure in the exhaust gas recirculating passageway at a location upstream of the exhaust gas recirculating valve, that is, back pressure in the exhaust gas pipe decreases as the atmospheric pressure decreases, resulting in that the exhaust gas recirculating rate decreases. As a consequence, the air/fuel ratio of the air/fuel mixture becomes leaner, and the degree of this leaning of the air/fuel ratio is larger during exhaust gas recirculating operation than the degree of leaning of the mixture effected with a drop in the atmospheric pressure when the exhaust gas recirculating operation is not effected. Therefore, during the exhaust gas recirculating operation, correction of the air/fuel ratio in dependence upon the atmospheric pressure merely by means of the atove atmospheric pressure-dependent coefficient KPA alone is insufficient to control the air/fuel ratio to a desired valve with accuracy. On the other hand, if the exhaust gas recirculation rate is maintained at a constant value irrespective of changes in the atmospheric pressure, the atmospheric pressure-dependent coefficient KPA can be directly applied to control of the air/fuel ratio. Details of this exhaust gas recirculating control method is disclosed in U.S. Ser. No. 443,563, now U.S. Pat. No. 4,454,853, assigned to the same assignee as the present application.

Referring again to FIG. 3, the program proceeds to the step 5, wherein a desired valve opening command value LCMD is calculated by multiplying the basic valve lift value LMAP read from the map in the step 3 by the correction coefficient KE calculated at the step 4. Depending upon operating conditions of the engine, however, this desired valve opening command value LCMD can be set to a value which exceeds the maximum possible valve opening value LMAX corresponding to the operatable limit of the exhaust gas recirculating valve 19, since the command value LCMD is obtained by multiplying the basic valve lift value LMAP by the correction coefficient KE as noted above. In order to prevent this, it is determined whether or not the desired valve opening command value LCMD is larger than the maximum possible valve opening value LMAX, at the step 6. If the answer to the question of the step 6 is negative, execution of the program is terminated. If the answer to the question of the step 6 is affirmative, the program proceeds to the step 7, wherein the desired valve opening command value LCMD is set to a value equal to the maximum possible valve opening value LMAX, followed by termination of execution of the program.

Next, described will be an example of the manner of determining abnormality in an output value from the valve lift sensor 24, that is, abnormality in the exhaust gas recirculation control system, on the basis of the desired valve opening command value LCMD calculated in the manner shown in FIG. 3 and the actual valve opening value LACT supplied from the valve lift sensor 24.

Figure 5:
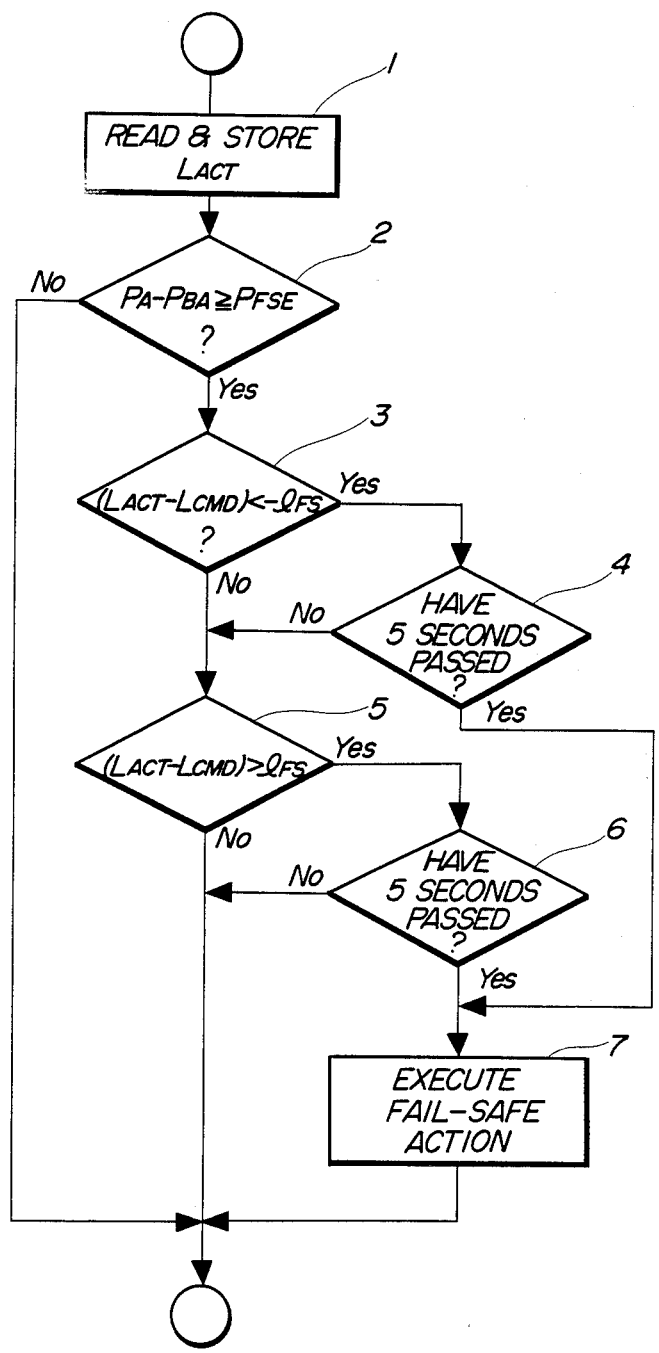
FIG. 5 is a flow chart showing a manner of determinating abnormality in detecting means for detecting the valve opening of the exhaust gas recirculating valve.

FIG. 5 shows the exemplary manner of determination as to whether or not there is abnormality in the output value of the valve lift sensor 24, which is executed in the CPU 501 in FIG. 2.

At the step 1, the actual output value from the valve lift sensor 24 is read and stored. Then, a determination is made as to whether the difference between the atmospheric pressure PA detected by the atmospheric pressure sensor 9 and the intake pipe absolute pressure PBA corresponding to negative pressure PB detected by the negative pressure sensor 8 is larger than a predetermined value PFSE, at the step 2. If the answer to the question of the step 2 is negative, that is, if the relationship PA−PBA<PFSE stands, the program is terminated without executing the following steps. This step 2 is provided for the following reason: When the difference between the pressures acting upon the opposite side surfaces of the diaphragm 19$b$ of the exhaust gas recirculating valve 19 is below the predetermined value PFSE, the diaphragm 19$b$ cannot be displaced in the valve opening position against the force of the spring 19$c$ even when the EGR control valve 22 is energized by a driving pulse from the ECU 5 to introduce the negative pressure PB into the negative pressure chamber 19$d$. As a consequence, the CPU can make a wrong diagnosis that there abnormality in the output value of the valve lift sensor 24, if the steps following the step 2, hereinafter referred to, are executed for abnormality detected.

If the answer to the question of the step 2 is affirmative, it is determined whether or not the absolute value of the difference between the actual valve opening value LACT and the desired valve opening command value LCMD is larger than a predetermined value 1FS, at the steps 3 and 5. The predetermined value 1FS is set at a value corresponding to a minimum possible controllable amount of the valve opening of the exhaust gas recirculating valve 19, below which the valve is not responsively operatable. If the answers to the questions of the steps 3 and 5 are both negative, that is, if the relationship |LACT−LCMD| <1FS stands, execution of the program is terminated on the assumption that there is no abnormality in the output value of the valve lift sensor 24.

On the other hand, if the anwer to the question of either the step 3, or the step 5 is affirmative, it is determined at the step 4 or the step 6 whether or not the absolute value of the difference between the actual valve opening value LACT and the desired value opening command value LCMD, which is larger than the predetermined value 1FS, has lasted over a predetermined period of time, e.g. 5 seconds. If no abnormality actually exists in the exhaust gas recirculation system including the valve lift sensor 24 while at the same time the absolute value of the difference between the actual valve opening value LACT and the desired valve opening command value LCMD is larger than the predetermined value 1FS, the actual valve opening value should change in a direction such that the above absolute value of the above difference becomes smaller than the predetermined value 1FS before the passages of at least 5 seconds. Therefore, according to the invention, if such change of the valve opening value does not take place within the 5 seconds, it is determined that there is an abnormality in the exhaust gas recirculation system including the valve lift sensor 24.

If the answer to the question of either the step 4 or the step 6 is affirmative, that is, if the predetermined period of time of 5 seconds has elapsed, the program proceeds to the step 7, wherein a fail-safe action is executed. Preferably, as the fail-safe action, the exhaust gas recirculating valve 19 is fully closed so as to interrupt the recirculation of the exhaust gases.

The desired valve opening command value LCMD applied to the determinations in the steps 3 and 5 is prohibited from being set to a value exceeding the maximum possible valve opening value LMAX which corresponds to the operatable limit of the exhaust gas recirculating valve 19, by providing the aforementioned steps 6 and 7 in FIG. 3. Therefore, by virtue of the steps 6 and 7 in FIG. 3, it is avoided that the desired valve opening command value LCMD is set to a value exceeding the maximum possible valve opening LMAX and the absolute value |LACT−LCMD| does not become smaller than the predetermined value 1FS even after passage of the predetermined period of time, causing unexpected execution of the fail-safe action.

What is claimed is:

1. A method of controlling an exhaust gas recirculating quantity in an internal combustion engine having an exhaust gas passage, an intake air passage, an exhaust gas recirculating passageway communicating said exhaust gas passage with said intake air passage, an exhaust gas recirculating valve arranged across said exhaust gas recirculating passageway for regulating said quantity of exhaust gases recirculating from said exhaust gas passage to said intake air passage, a valve actuator means for actuating said exhaust gas recirculating valve to close or open, and detecting means for detecting actual valve opening of said exhaust gas recirculating valve, the method being adapted to calculate a desired valve opening value of said exhaust gas recirculating valve in response to operating conditions of said engine, calculate the difference between said actual valve opening value detected by said valve opening detecting means and said desired valve opening value, and operate said valve actuator means so as to minimize said difference, the method comprising the steps of: (1) comparing said calculated desired valve opening value with a maximum possible valve opening value of said exhaust gas recirculating valve; and (2) setting said desired valve opening value to said maximum possible valve opening value when said calculated desired valve opening value exceeds said maximum possible valve opening value.

2. A method as claimed in claim 1, further including the steps of comparing an absolute value of said difference with a predetermined value, and determining that an abnormality has occurred in said valve opening detecting means when said absolute value of said difference has continued to exceed said predetermined value over a predetermined period of time.

3. A method as claimed in claim 1, wherein said valve actuator means is a pressure responsive type having operatively a diaphragm operatively connected to said exhaust gas recirculating valve, said diaphragm being operable in response to the magnitude of operating pressure acting thereupon.

* * * * *